United States Patent
Grose et al.

(10) Patent No.: US 9,132,876 B2
(45) Date of Patent: Sep. 15, 2015

(54) OMNIDIRECTIONAL VIBRATION ISOLATING FOOT PEG

(71) Applicants: Craig M. Grose, Fillmore, UT (US); Tyson C. Grose, Fillmore, UT (US); Robert A. Davies, Fillmore, UT (US)

(72) Inventors: Craig M. Grose, Fillmore, UT (US); Tyson C. Grose, Fillmore, UT (US); Robert A. Davies, Fillmore, UT (US)

( * ) Notice: Subject to any disclaimer, the term of this patent is extended or adjusted under 35 U.S.C. 154(b) by 0 days.

(21) Appl. No.: 14/080,714

(22) Filed: Nov. 14, 2013

(65) Prior Publication Data

US 2015/0130162 A1    May 14, 2015

(51) Int. Cl.
*B62J 25/00*    (2006.01)

(52) U.S. Cl.
CPC .......................... *B62J 25/00* (2013.01)

(58) Field of Classification Search
CPC ........................................................ B62J 25/00
USPC ................................ 280/291; 74/564; 296/75
See application file for complete search history.

(56) References Cited

U.S. PATENT DOCUMENTS

| | | | |
|---|---|---|---|
| 4,458,910 A * | 7/1984 | Stillwagon | 280/291 |
| 4,546,993 A * | 10/1985 | Walker | 280/291 |
| 5,454,580 A * | 10/1995 | Lin | 280/291 |
| 5,826,900 A * | 10/1998 | Steele | 280/291 |
| 6,070,897 A * | 6/2000 | Hsieh et al. | 280/291 |
| 6,161,859 A * | 12/2000 | Cheng | 280/291 |
| 6,390,488 B1 * | 5/2002 | Wallingsford | 280/291 |
| 6,663,129 B1 * | 12/2003 | Smith | 280/291 |
| 2008/0179859 A1 * | 7/2008 | Boehmke et al. | 280/291 |
| 2010/0127474 A1 * | 5/2010 | Jans | 280/291 |

* cited by examiner

Primary Examiner — Tony Winner

(57) ABSTRACT

A motorcycle foot peg (10) constructed to help isolate a rider from vibration and impact forces normally transmitted through a solid foot peg. The isolating foot peg is applicable for on and off road use where prolonged vibration or discrete impacts may cause injury. The foot peg has an adaptable rigid mounting platform (11) from which a rigid foot peg supporting shaft (19) projects outward in a cantilevered fashion. The supporting shaft is inserted through an internal aperture (34) and secured to an internal rigid tube (29) of a bushing (27). The bushing filled with a vibration isolating material (32) externally is secured to a receiver (23), which is incorporated into a foot peg platform (22). The foot peg platform (22) is thereby isolated from the supporting shaft (19) and motorcycle frame (12) by vibration damping material (32) with in the bushing (27). This relationship allows for reduction of vibratory forces that would normally be transmitted to the rider through a conventional solid Foot peg platform.

10 Claims, 3 Drawing Sheets

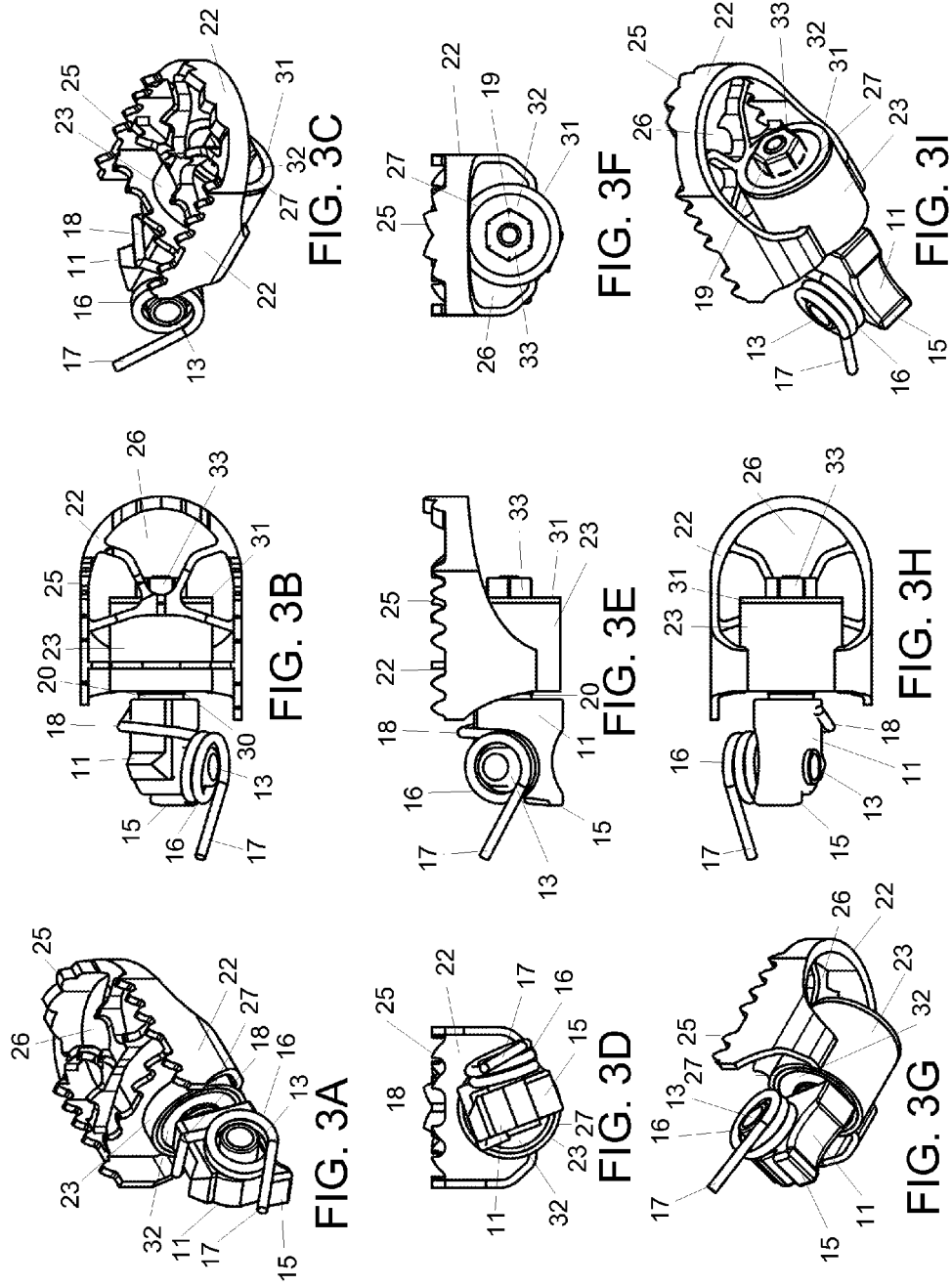

OMNIDIRECTIONAL VIBRATION ISOLATING FOOT PEG

BACKGROUND

Prior Art

The following is a tabulation of some prior art that presently appears relevant:

U.S. PATENT DOCUMENTS

| Patent Number | Kind Code | Issue Date | patentee |
|---|---|---|---|
| 6,390,488 | B1 | May 21, 2002 | Wallingsford |
| 6,663,129 | B1 | Dec. 16, 2003 | Smith |
| 4,458,910 | A | Jul. 10, 1984 | Stillwagon |
| 4,546,993 | A | Oct. 15, 1985 | Walker |
| 5,454,580 | A | Oct. 3, 1995 | Lin |
| 5,826,900 | A | Oct. 27, 1998 | Steele |
| 6,070,897 | A | Jun. 6, 2000 | Hsieh |
| 6,161,859 | A | Dec. 19, 2000 | Cheng |

This invention relates to motorcycles, and more particularly to an improvement in foot pegs for motorcycles. In this specification, reference to motorcycles includes two, three, and four wheeled vehicles, which are ridden in a manner similar to motorcycles.

It is well known most motorcycle assemblies include a frame having a seat on which a rider sits in a straddle fashion. A pair of foot pegs is carried at the lower end of the frame at opposite sides thereof for the rider to place feet while riding. The foot pegs are mounted on each side of the motorcycle and are normally connected to the motorcycle frame by hinge connections. The foot pegs may thereby be folded up against the frame at a forty-five-degree angle if contact is made with a solid object or if the motorcycle is laid down or falls to the ground on it's side. The foot pegs are normally deployed in a cantilevered position projecting straight out from the motorcycle frame while the motorcycle is traveling. The rider then rests his or her feet upon the foot pegs. The foot pegs thereby serve as a platform to support the Rider's feet and allow for activation of foot controls located in proximity to the foot pegs. The design of conventional motorcycle foot peg has some inherent disadvantages. For example motorcycle foot pegs are designed to provide protective support for the feet of the rider, but may also be a source of injury. These injuries can occur when the rider incurs an abrupt impact to the foot and ankle from a hard jump landing or unforgiving trail obstacle. Commonly riders may experience micro trauma to the feet from hours of vibration and miles of focused pressure. These injuries can range from temporary fatigue, bruising, and tendon pain to more long term impairing nerve damage, arthritis, and broken bones.

Motorcycle foot pegs that are built for off-road use are made with an aggressive tooth design to help the rider's feet grip the foot pegs in all conditions. Frequently, however, the grip points of the foot pegs fail to remain in constant contact because of vibrations, bumps and lack of flexibility offered by conventional foot pegs. The lack of flexibility offered by conventional foot pegs fails to keep the surface of the foot peg in flat contact with the surface of the riders boot, leading to loss of grip and possible injury.

It is the principle object of this invention to provide an improved foot peg for motorcycles.

It is a further object of this invention to provide a foot peg for motorcycles that increases rider surefootedness and control while reducing impact and vibratory trauma to the foot.

SUMMARY OF THE INVENTION

The invention, in its broadest aspect includes a foot peg for a motorcycle which has a platform portion the upper surface of which is adapted to receive a riders foot, the body portion having a ring aperture passing through a substantial part of the length thereof adapted to accommodate the external diameter of a fitted bushing. A bushing filled with a vibration isolating substance, externally secured to a mounting ring attached to the foot peg platform while internally containing a tube aperture to slide onto and be secured to a mounting shaft extending outwardly from the foot peg mount. This serves to completely isolate the platform portion of the foot peg from a foot peg mount connected to the frame of a motorcycle.

BRIEF DESCRIPTION OF DRAWINGS

FIG. 3A is an oblique view from above and internal aspect of the foot peg of FIGS. 1 and 2

FIG. 3B is a top view of the foot peg of FIGS. 1 and 2

FIG. 3C is an oblique view from above and external aspect of the foot pet of FIGS. 1 and 2

FIG. 3D is an internal end view of the foot peg of FIGS. 1 and 2

FIG. 3E is a side view of the foot peg of FIGS. 1 and 2

FIG. 3F is an external end view of the foot peg of FIGS. 1 and 2

FIG. 3G is an oblique view from below and internal aspect of the foot peg of FIGS. 1 and 2

FIG. 3H is a bottom view of the foot peg of FIGS. 1 and 2

FIG. 3I is an oblique view from below and external aspect of the foot peg of FIGS. 1 and 2

DRAWINGS

Reference Numerals

Figure 1:
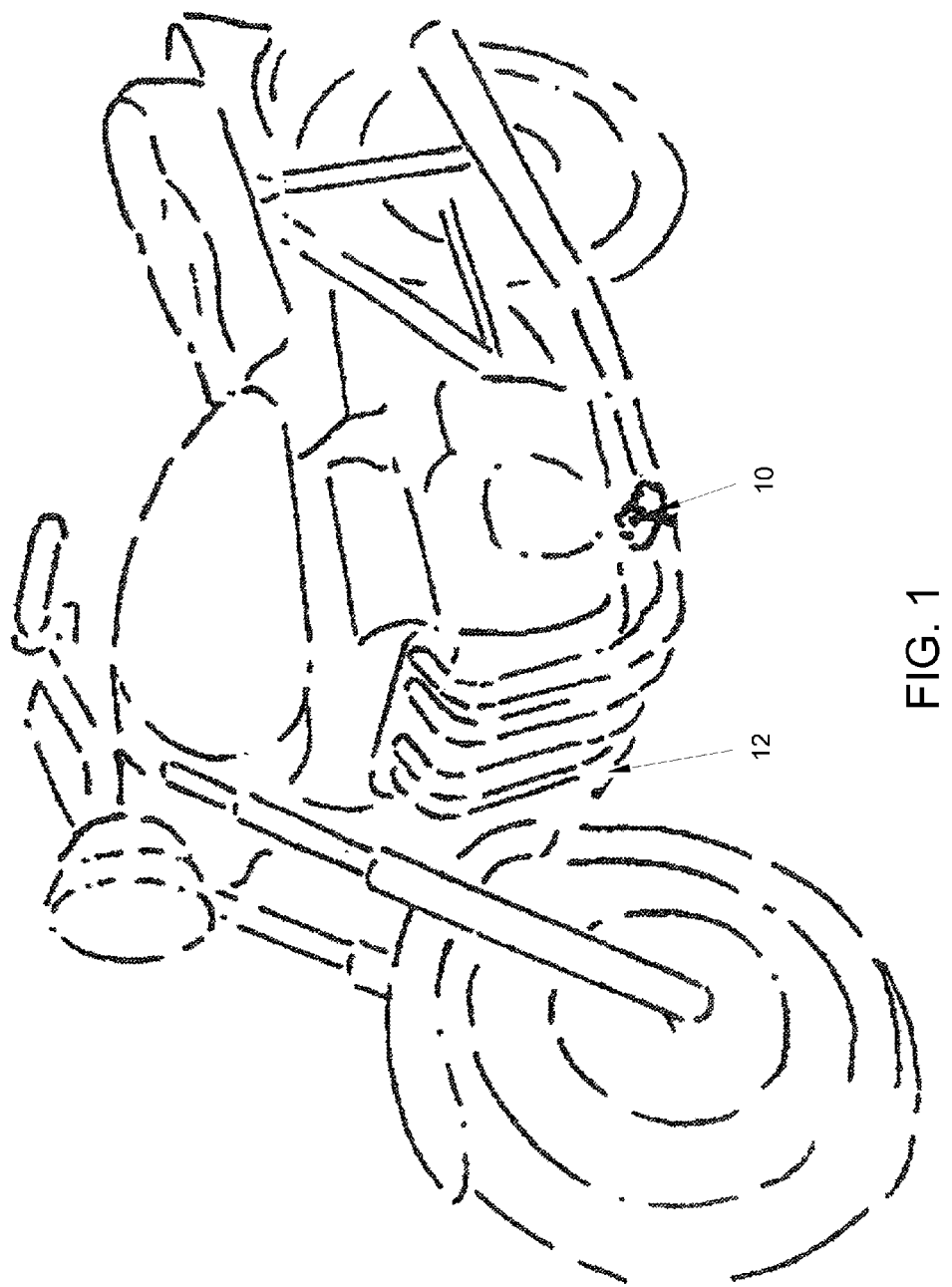
FIG. 1 shows a perspective view illustrating one embodiment of a foot peg affixed to part of the frame of the motorcycle.

10 Foot peg assembly
11 Foot peg mount
12 Motorcycle Frame
13 Adaptor Bushing
13A Adaptor Bushing narrowed diameter
13B Adaptor Bushing widened collar
14 Mounting base central aperture
15 Mounting base block stop
16 Return spring assembly
17 Return spring arm resting against frame
18 Return spring arm resting against foot peg
19 Foot peg mount shaft
20 Elevated foot peg shaft collar
21 Foot peg shaft thread
22 Foot peg platform
23 Platform ring receiver
24 aperture of ring receiver
25 Platform Teeth
26 Mud clearing space
27 Vibration isolating bushing
28 Rigid external bushing surface
29 Rigid internal bushing tube
30 Internal bushing tube teeth
31 Lateral Bushing Collar
32 Vibration reducing material
33 Locking Nut
34 Internal bushing tube aperture

DETAILED DESCRIPTION OF THE DRAWING
FIGS. 1-3

One Embodiment

Figure 2:
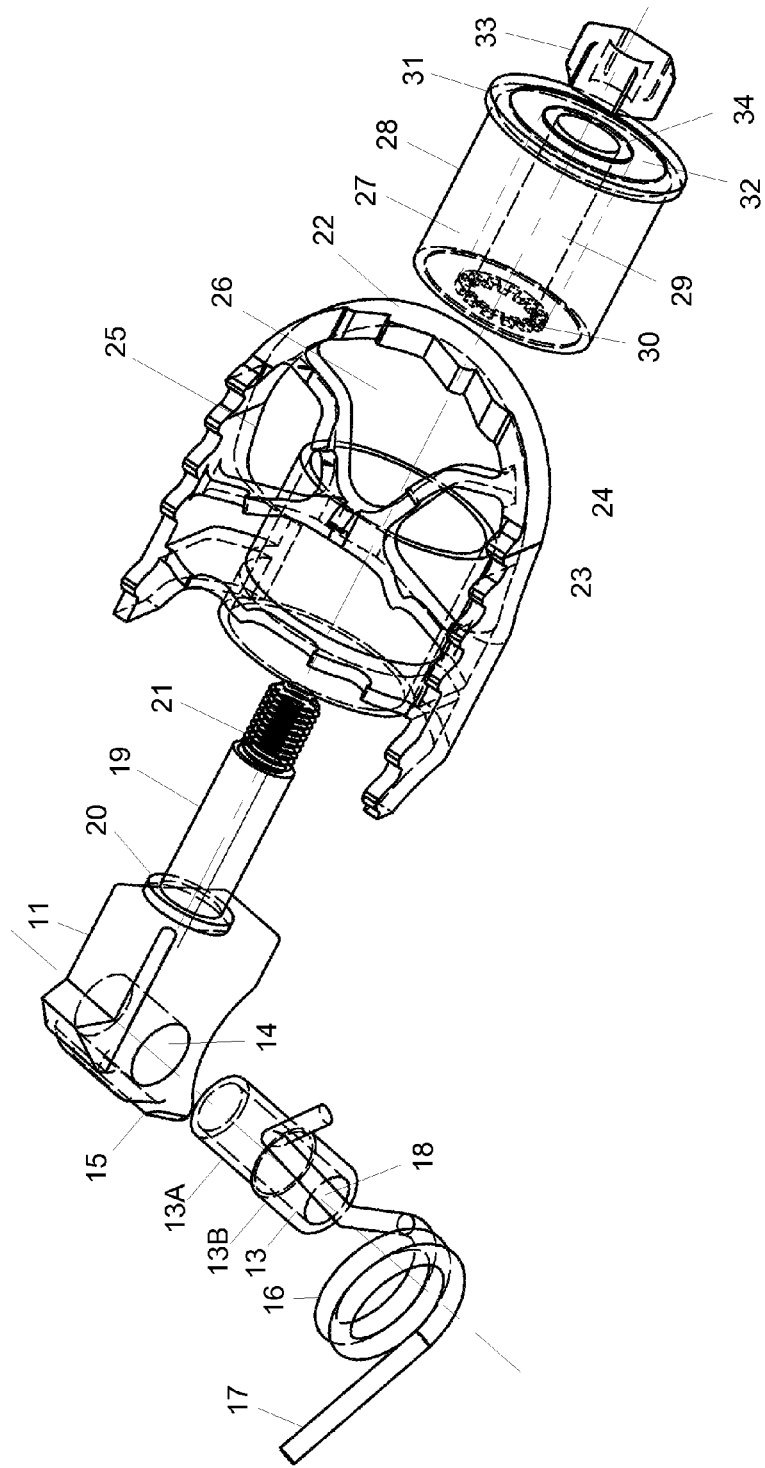
FIG. 2 shows an exploded view of the foot peg in FIG. 1

The embodiment of FIGS. 1 through 3 show a foot peg assembly 10 which has a mount 11 which can be adapted to attach on part of the motorcycle or frame 12. These mounts will be largely specific to particular types of motorcycles but the embodiment pictured shows a generic mount 11 with a variable bushing 13 allowing for adaptability of mounting application.

As shown in FIGS. 2 and 3 the foot peg mount 11 may have a base adapted to be located within a generic motorcycle frame receiver accompanied by a bushing 13 of variable size to accommodate variation in receiver width and mounting pin size offered by different motorcycle manufacturers. The variable bushing 13 has an area of narrow diameter 13A to fit inside the mounting base 11 central aperture 14, and a collar area of widened diameter 13B of variable length to accommodate the variable receiver width offered by different motorcycle manufacturers. The narrow bushing area 13A may be alternatively inserted superiorly or inferiorly into the mounting base 11 central aperture 14, with resultant raising or lowering of the foot peg mount 11 in relation to the motorcycle frame 12 by the length of the collar area of widened diameter 13B.

The mounting base 11 shown in FIG. 2 contains a central aperture 14 to accommodate the narrow diameter 13A of a variable bushing 13.

The mounting base 11 shown in FIGS. 2 and 3 is configured to contain a block stop 15, which rests against the motorcycle frame 12 within the motorcycle frame foot peg receiver to prevent extension of the foot peg to an angle greater than 90 degrees perpendicular to the motorcycle frame.

As Shown in FIGS. 2 and 3, the foot peg base 11 with a variable bushing 13 inserted, allows for a return spring assembly 16 to be applied over the bushing 13 with one arm of a return spring assembly 17 resting against the motorcycle frame 12 within the motorcycle frame foot peg receiver. A second arm of a return spring assembly 18 may extend over the superior aspect of the mounting arm 11 allowing the foot peg to rise with impact then return to a position perpendicular to the frame.

As shown in FIGS. 2 and 3, extending from the foot peg mount 11 there is a foot peg shaft 19 which, as illustrated, has an elevated shaft collar 20 which may be smooth or toothed to allow for the medial aspect 30 of the internal tube 29 of the bushing 27 to rest while isolating the external aspect of the bushing 28 and foot peg platform 22 from the foot peg mount 11. The foot peg shaft is threaded 21 to accommodate a retention and or locking nut 33.

The foot peg platform 22 has an inferior incorporated ring receiver 23 with an internal aperture 24 designed to accommodate and secure the external aspect of a vibration isolating bushing. Superiorly the foot peg platform, as illustrated, has some relatively aggressive protuberance or teeth 25. The form these teeth 25 take may very depending on the application and manufacture of the foot peg. More aggressive teeth may be required for more aggressive riding situations. Space is allowed with in the foot peg platform 26 to accommodate the clearance of mud or debris encountered by various terrains.

The foot peg vibration isolating bushing 27 comprised of a rigid external surface is pressed or secured to an inferior platform ring receiver 23. The body of the bushing 32 composed of a vibration isolating substance vulcanized or otherwise secured to an external rigid surface 28 and an internal rigid tube 29 of the bushing 27. The internal rigid tube 29 of the bushing designed to accommodate a rigid foot peg mount shaft 19 through its internal aperture 34. The internal rigid tube 29 is designed to be secured but adjustable to the elevated shaft collar 20, with an internal medial tooth type pattern 30. The internal medial aspect tooth type pattern 30 may vary or be left smooth to allow for variation or limitation of rotation upon said shaft with addition of lubrication and or a wear resistant material as needed for durability. The external and lateral aspect of this bushing embodiment demonstrates an incorporated retention collar 31 to prevent migration of the platform ring receiver 23 over the bushing 27 in a lateral direction.

The retaining nut 33 is shown in this embodiment to secure the internal rigid tube of the bushing 29 to the foot peg shaft 19, which serves to limit the lateral migration of the bushing 27 off the shaft 19. The retaining nut 33 can also be used to lock the internal medial aspect of the bushing 30 in the angle or position preferred in relation to the elevated shaft collar 20.

In many riding situations, there is substantial and sustained impact and vibrational force transmitted to the feet of the rider. These forces vary in direction and velocity as the motorcycle moves over varied terrain and obstacles.

In operation, this unique foot peg design allows for consistent reduction of force through isolation of the foot peg platform 25 from the foot peg mount to the frame 11. Because the vibration and impact reducing material 32 completely surrounds the foot peg shaft 19, it allows for reduction of force transmitted to the rider from any direction.

The natural elasticity of the vibration and impact reducing material 32, as well as the rotational adjustability of the bushing 27 on the foot peg shaft 19, allows for greater rider positioning, safety, comfort, and control. The rider is able to retain a more neutral position in relation to the uneven terrain encountered by the motorcycle. More contact with the platform surface further reduces force transmitted to the foot of the rider while promoting better grip to the foot peg.

Even riding over smoother terrain for a long period of time can be very fatiguing and cause feet to fall asleep or be injured reducing feeling in extremities. The Foot peg platform 22 isolated by vibration dampening bushing 27 may significantly reduces fine vibratory trauma.

Undoubtedly, numerous variations and modification of the invention will become readily apparent to those familiar with motorcycle construction and safety features. For example;

A spring could be incorporated on the foot peg to allow lateral mobility and return of the foot peg to neutral position. Many rigid substances such as graphite may be used for foot peg components for weight savings. Different substances could be used to isolate the foot peg platform 22. The suspension could be reversed with the shaft attached to the foot peg plat form and the bushing to the frame.

Accordingly, the scope of the invention should not be construed as limited to this specific embodiment depicted and described herein, but rather is defined in the claims appended hereto.

We claim:

1. An omnidirectional vibration isolating foot peg, comprising:
   a. a rigid shaft attached to a vehicle by means of an adaptable mount so as to project outward in a cantilevered fashion from the vehicle frame,
   b. a vibration dampening bushing having a predetermined cross-sectional shape, with an internal aperture which accommodates and is mounted on said shaft,
   c. said bushing constructed of a vibration dampening material or elastomer, d. a foot peg platform attached to a receiver, to accommodate and mount to an external diameter of said bushing, wherein said foot peg platform may be isolated from the vehicle and a rider may experience a substantial decrease in vibratory force applied from any direction.

2. The foot peg of claim 1 where in said internal aperture of said bushing of said foot peg is able to rotate on said shaft to a predetermined degree, wherein said foot peg may be vibrationally isolated from the vehicle and allow a rider to adjust a platform angle to accommodate riding position on said foot peg as the vehicle changes angles, so that the rider may experience a significant decrease in pedal trauma and fatigue.

3. The foot peg of claim 1 wherein said internal aperture of said bushing of said foot peg is able to rotate on said shaft to a predetermined degree.

4. The foot peg of claim 1 wherein said vibration dampening material or elastomer allows said foot peg platform to rotate or shift to a certain degree and return to its original position.

5. The foot peg of claim 1 wherein a base mount attachment is comprised of a universal adaptable mount using a hole with a variable bushing of predetermined length and cross sectional area to accommodate various vehicle mounts and allow said foot peg height adjustment.

6. The foot peg of claim 1 wherein said foot peg and said shaft are made of metal.

7. The foot peg of claim 1 wherein said foot peg and or said shaft are made of another material than metal.

8. The foot peg of claim 1 wherein said bushing comprising of a vulcanized material.

9. The foot peg of claim 1 wherein said bushing is made of polyurethane or any other molded vibration absorbing substance.

10. The foot peg of claim 1 wherein said receiver is rotatable relative to said internal aperture to a predetermined degree.

* * * * *